Nov. 3, 1942.     E. B. ANKENMAN     2,300,857
OVERLOAD PROTECTION FOR MULTISPEED MOTORS
Filed June 21, 1941
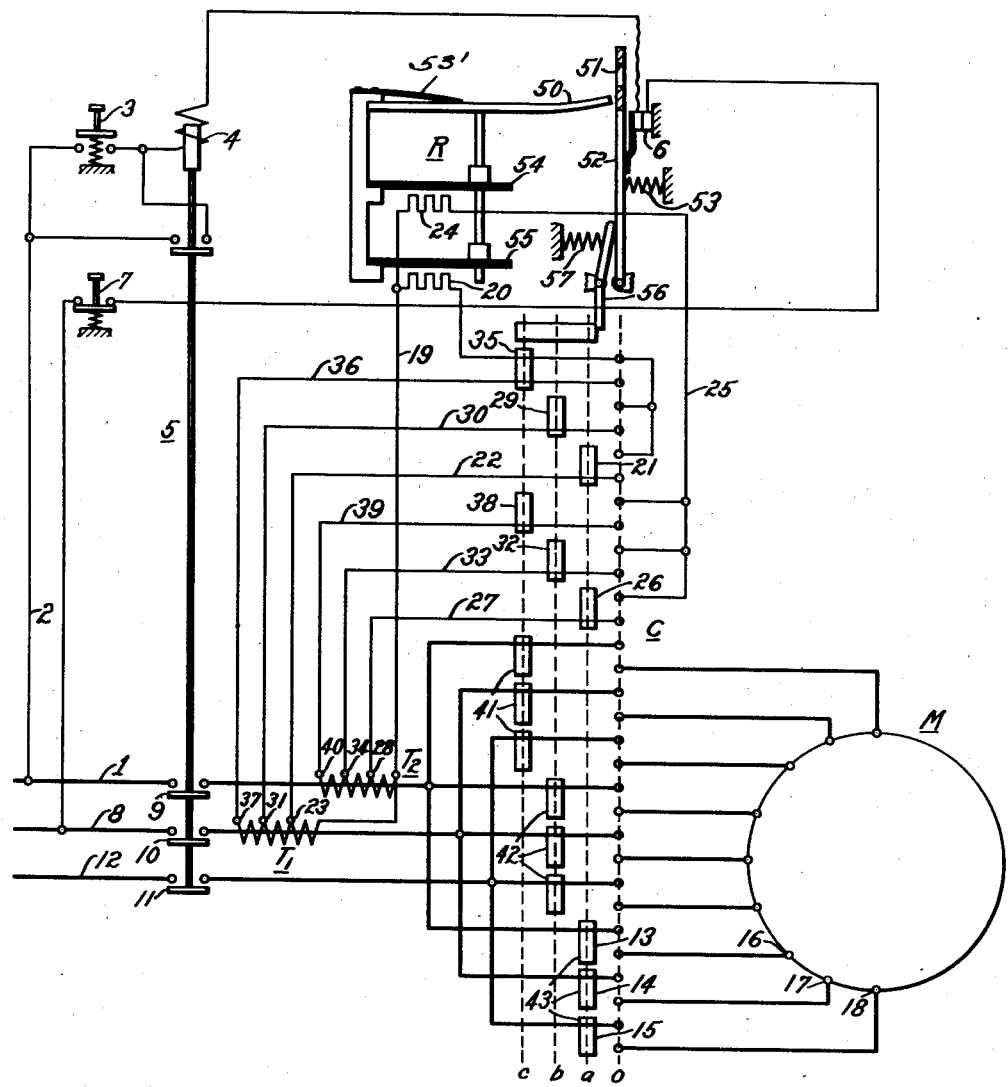
WITNESSES:
Wm. B. Sellers.
Nm. C. Groome
INVENTOR
Earl B. Ankenman.
BY
Paul E. Friedemann
ATTORNEY Patented Nov. 3, 1942

2,300,857

UNITED STATES PATENT OFFICE 2,300,857

OVERLOAD PROTECTION FOR MULTI-SPEED MOTORS

Earl B. Ankenman, North Quincy, Mass., assignor to Westinghouse Electric & Manufacturing Company, East Pittsburgh, Pa., a corporation of Pennsylvania Application June 21, 1941, Serial No. 399,115

3 Claims. (Cl. 172—179)

My invention relates to motor control systems and more particularly to systems of control for protecting multi-speed motors against overloads.

Multi-speed motors whose control consists of a line-starter and a manually operated speed selecting drum are at present, that is, by prior art devices, protected by one set of overload relays in the circuit between the line-starter and the speed selecting drum. Such limited protection is often not sufficient nor proper where a motor is designed for several different running speeds.

One object of my invention is the provision of a simple single overload protecting means for protecting a multi-speed motor against overload for any operating speed selected.

A broad object of my invention is the provision of overload protection for multi-speed motors.

Other objects and advantages will become more apparent from a study of the following specification and the accompanying drawing, in which the single figure shows diagrammatically an embodiment of my invention.

My control includes the use of a single overload relay having two heaters. These heaters are, respectively, supplied with energy from the secondaries of two current transformers connected, respectively, into two of the phases of the supply for the motor to be protected. These transformer secondaries, have a number of taps for different capacities. The pole changing drum of a drum controller is provided with additional segments for altering the connection of the secondaries of the transformers to the heaters with each selection of speed for the motor. The additional segments on the drum are so arranged that at the speed taking the smallest armature current the secondary of each of the current transformers are connected to the heaters on the full capacity taps of the transformers. As speeds are selected requiring more motor current the heaters are connected to the partial winding taps on the current transformers. This allows approximately constant currents to flow through the heaters in the overload relay and proper protection is thus provided for all speeds.

A thorough understanding of my invention can probably be best had from a study of typical operating cycles. If the attendant wishes to start the motor M, say for the slowest speed, he first operates push button 3 and thereafter operates the controller C from the O, or "off" position, to a speed position. By the first operation a circuit is established from the bus 1 through conductor 2, push button 3, actuating coil 4 of line contactor 5, contact members 6 of the thermostatically controlled overload relay R, stop push button 7, to the bus 8. Line contactor 5 thus operates to close the contact members 9, 10 and 11. No circuits are, however, established to the motor unless the second operation has also been completed.

By the second operation the controller C is moved from the O, or "off" position, to any one of the operating positions. If the controller is moved to the $a$ or first speed position, a circuit is established from the buses 1, 8 and 12 through the contact members 9, 10 and 11, controller segments 13, 14 and 15 to the low speed windings of the motor which windings are indicated by junctions 16, 17 and 18.

If the characteristic of the load on the motor is such that this low speed corresponds to a high armature current then to properly protect the multi-speed motor against an overload, it is necessary that the thermostatically controlled relay be made responsive, not only in a proper manner to the armature current, but also to the speed setting, that is, speed of operation of the motor. This I accomplish by the use of the multi-tap current transformers $T_1$ and $T_2$ and the relay R energized from these transformers.

At the low speed setting, that is, for the $a$ controller position the following circuits are established: One circuit is established from the right-hand terminal of transformer $T_1$ through conductor 19, heater 20, controller segment 21, and conductor 22 to the low capacity tap 23 of the transformer $T_1$. Another circuit is established from the upper right-hand terminal of transformer $T_2$ through conductor 19, heater 24, conductor 25, controller segment 26, and conductor 27 to the low capacity tap 28 of transformer $T_2$.

Since the low-capacity taps of the transformers are used, the heaters 20 and 24 of the relay R are heated as a function of motor load current and thus motor speed. The motor is thus properly protected against overload.

Now if the motor is to be operated at a higher speed the controller is moved to the $b$ or medium speed position. At this speed, the armature current for the load characteristic assumed is lowered. This means that the relay should be energized by a ratio of load current to offset the decrease in primary current in the overload transformer. In the second or $b$ position, the circuits for the heaters 20 and 24 are interrupted at segments 21 and 26, respectively. A circuit is, however, established from segment 29 through conductor 30 to the medium capacity tap 31, and another circuit from segment 32 through conductor 33 to the medium capacity tap 34. The relay R is thus energized a greater amount.

For the high speed position, the $c$ position, it will be noted that the circuits for the heaters 20 and 24 are again interrupted, this time at the segments 29 and 32, respectively. New heater circuits are, however, established one for heater 20 from segment 19 through conductor 36 to the full capacity tap 37, and another for heater 24 from segment 38 through conductor 39 to the full capacity tap 40. For the lowest motor load current the greatest transformer capacity is used.

Since the controller segments 41, 42 and 43 are in structure, arrangement and function like the segments 21, 29 and 35, and 26, 32 and 38, it is apparent that as the speed settings are changed from, say, $a$ to $b$ and then to $c$, the motor is first actuated to connect the motor for the greatest pole winding connection to thus obtain lowest speed, and then the motor is momentarily deenergized and again energized to connect the motor for a medium number of poles to get a medium speed, and on the $c$ position the motor is again momentarily deenergized and then reenergized for the lowest number of poles to get maximum speed.

In the event of an overload dangerous to the motor for any speed that may be selected, the relay R will function to open the contact members 6. In so doing, the line starter 5 is deenergized and the motor M is thus disconnected from the buses 1, 8 and 12.

When the relay R operates, the arcuate end of arm 59 enters the aperture 51 of the spring biased pivoted lever 52 and the contact members 6 remain latched in the open position. To be able to restart the motor, the lever 51 must be rotated clockwise through a small angle to permit arm 50, acted upon by spring 53′, to drop. Of course, arm 50 will only drop after both of the thermostatic elements 54 and 55 have cooled enough to take the position shown.

The relay R per se and the means for resetting the relay are, in themselves, no part of my invention. Often such relays have the upper end of lever 52 provided with a handle for resetting the relay. The motor is started and stopped by means of push button switches 3 and 7, respectively, so that the resetting and the stopping and starting is made no part of the controller.

I, however, show means whereby the starting and the stopping, and the resetting are effected by the controller.

If the controller is moved from the position shown to any of its speed positions, the motor is started, and if the controller is returned to the position, the motor is stopped. On the other hand, if the motor is stopped by reason of the operation of the relay R, then the motor cannot be restarted except the controller be again moved to the "off" position. In moving the controller to the "off" position, the lever 56 is actuated clockwise by the spring 57. Spring 57 is sufficiently strong to overcome spring 53 to thus move lever 52 clockwise to reset relay R, by permitting lever 50 to drop.

As soon as relay R is reset and the controller C is again moved to any operating position, the lever 52, through counterclockwise operation of lever 56, moves against arm 50 so that arm 50 can again, in the event of an overload, coact with aperture 51.

If the motor load current characteristics are such that this current rises with a rise in speed, then the order of the connection of the capacity taps of the transformers $T_1$ and $T_2$ need merely be changed to be in reverse sequence.

I am, of course, aware that others, particularly after having had the benefit of my disclosure, may devise similar circuit arrangements for accomplishing the same or similar results. I, therefore, do not wish to be limited to the particular showing made, but wish to be limited only by the scope of the appended claims.

I claim as my invention:

1. In a system of control for a multi-speed motor, in combination, a multi-speed motor, a source of supply, switching means for connecting the motor to the source of supply, speed-selecting switching means for altering the connection of said motor to said source of supply to select any one of a plurality of speeds of operation of the motor, an overload relay, having means energized by the motor load current, for causing the operation of said switching means to disconnect the motor from the source of supply in the event of an overload on the motor, overload relay control means energized by the motor load current, said means having as many capacity taps as there are normal motor speeds that may be selected by the speed-selecting switching means, and means, operable by said speed-selecting switching means, for connecting capacity taps of the overload relay control means corresponding to the speed selected to the overload relay.

2. In a system of control for an alternating current motor of the multi-speed type, in combination, a plurality of power leads for supplying alternating current to the motor, speed selecting switching means for connecting the motor to the power leads for operation of the motor at any one of a plurality of selectable motor speeds whereby said motor draws a plurality of selectable normal load currents, current transformer means energized by the load currents in the power leads, said current transformer means having secondary means which have as many capacity taps as there are normal motor load currents, an overload relay, means for connecting the overload relay to such of the capacity taps of the secondary means, as different normal motor load currents are selected, to maintain the current through the overload relay substantially constant so long as only normal load current changes are made, and means operable by the overload relay for opening the circuit in the power lead in the event of an overload.

3. In a system of control for a multispeed motor, in combination, a multispeed motor, a source of supply, switching means for connecting and disconnecting the motor and source of supply, a current transformer having a primary winding energized by the load current of the motor and having a plurality of capacity taps on its secondary winding corresponding to the different speeds of the multispeed motor, a heater for a thermostatically controlled overload relay, control means for connecting the motor to the source of supply for different selected speeds of operation and for connecting the heater to the pair of capacity taps corresponding to the speed selected by said control means, and means operable by the overload relay for effecting the operation of said switching means to disconnect said motor from said source of supply upon occurrence of a motor load current which is an overload for the motor speed selected.

EARL B. ANKENMAN.